US008328624B2

(12) United States Patent
Walker et al.

(10) Patent No.: US 8,328,624 B2
(45) **Date of Patent: *Dec. 11, 2012**

(54) SLOT DRIVEN VIDEO STORY

(75) Inventors: Jay S. Walker, Ridgefield, CT (US); James A. Jorasch, Stamford, CT (US); Thomas M. Sparico, Riverside, CT (US); Jesse M. Fink, Wilton, CT (US)

(73) Assignee: IGT, Reno, NV (US)

( * ) Notice: Subject to any disclaimer, the term of this patent is extended or adjusted under 35 U.S.C. 154(b) by 1151 days.

This patent is subject to a terminal disclaimer.

(21) Appl. No.: 11/677,955

(22) Filed: Feb. 22, 2007

(65) Prior Publication Data

US 2007/0191092 A1 Aug. 16, 2007

Related U.S. Application Data

(63) Continuation of application No. 10/882,859, filed on Jul. 1, 2004, now Pat. No. 7,198,572, which is a continuation of application No. 10/272,554, filed on Oct. 16, 2002, now Pat. No. 6,893,341, which is a continuation of application No. 09/798,719, filed on Mar. 2, 2001, now Pat. No. 6,500,068, which is a continuation of application No. 08/832,723, filed on Apr. 11, 1997, now Pat. No. 6,234,896.

(51) Int. Cl.
*A63F 9/24* (2006.01)
*A63F 13/00* (2006.01)
*G06F 17/00* (2006.01)
*G06F 19/00* (2006.01)

(52) U.S. Cl. ................ 463/25; 463/30; 463/31; 463/34; 463/43

(58) Field of Classification Search ..................... 463/25
See application file for complete search history.

(56) References Cited

U.S. PATENT DOCUMENTS 4,375,286 A 3/1983 Seitz et al.

(Continued)

FOREIGN PATENT DOCUMENTS

GB 2 072 395 9/1981
GB 2 262 642 6/1993

OTHER PUBLICATIONS

Name That Tune as reported by Wikipedia, downloaded Jul. 23, 2010, 10 pages.*

(Continued)

*Primary Examiner* — Michael Cuff
*Assistant Examiner* — Kevin Y Kim
(74) *Attorney, Agent, or Firm* — Neal, Gerber & Eisenberg LLP

(57) ABSTRACT

A gaming system includes a network server connected to a plurality of gaming devices that are adapted to provide a video payout on each play based on a set of payout parameters. Memory at each gaming device stores payout parameters that correspond to each possible gaming result or outcome. When a play is initiated by a player, a gaming result is generated at a gaming device. The gaming device responds by accessing a corresponding payout parameter from the memory which may be a monetary amount, a video presentation segment or a combination thereof. If the payout is video, the network server receives the payout parameter and transmits video presentation segment to the gaming device accordingly. The gaming device then provides a video payout, in the form of displayed video presentation, to the player. The player thus receives at least one form of payment on each play.

29 Claims, 13 Drawing Sheets

SLOT MACHINE PAYOUT TABLE 36

| REEL OUTCOME | 1 COIN | 2 COINS | 3 COINS |
|---|---|---|---|
| BAR/BAR/BAR | 50 | 100 | 150 |
| CHERRY/CHERRY/CHERRY | 25 | 50 | 75 |
| LEMON/LEMON/LEMON | 15 | 30 | 45 |
| BELL/BELL/BELL | 10 | 20 | 30 |
| BAR/BAR/CHERRY | 5 | 10 | 15 |
| CHERRY/CHERRY/BAR | 1 | 2 | 3 |
| BELL/BELL/LEMON | 30 SEC. VIDEO | 60 SEC. VIDEO | 90 SEC. VIDEO |
| PEACH/PEACH/BELL | 15 SEC. VIDEO | 30 SEC. VIDEO | 45 SEC. VIDEO |
| ALL OTHERS (LOSING COMBINATIONS) | 10 SEC. VIDEO | 20 SEC. VIDEO | 30 SEC. VIDEO |

U.S. PATENT DOCUMENTS

| | | | | |
|---|---|---|---|---|
| 4,553,748 | A | 11/1985 | Allen et al. | |
| 4,618,150 | A | 10/1986 | Kimura | |
| 4,799,683 | A | 1/1989 | Bruner, Jr. | |
| 4,839,743 | A | 6/1989 | Best et al. | |
| 4,858,930 | A * | 8/1989 | Sato | 463/23 |
| 5,127,651 | A | 7/1992 | Okada | |
| 5,142,358 | A | 8/1992 | Jason | |
| 5,259,613 | A | 11/1993 | Marnell, II | |
| 5,373,440 | A | 12/1994 | Cohen et al. | |
| 5,393,057 | A * | 2/1995 | Marnell, II | 463/13 |
| 5,393,061 | A | 2/1995 | Manship et al. | |
| 5,411,258 | A | 5/1995 | Wilson et al. | |
| 5,423,539 | A | 6/1995 | Nagao | |
| 5,429,361 | A * | 7/1995 | Raven et al. | 463/25 |
| 5,449,173 | A | 9/1995 | Thomas et al. | |
| 5,472,195 | A | 12/1995 | Takemoto et al. | |
| 5,488,411 | A | 1/1996 | Lewis | |
| 5,494,287 | A | 2/1996 | Manz | |
| 5,508,731 | A | 4/1996 | Kohorn | |
| 5,513,846 | A | 5/1996 | Niederlein et al. | |
| 5,547,202 | A * | 8/1996 | Tsumura | 463/29 |
| 5,579,537 | A | 11/1996 | Takahisa | |
| D378,604 | S | 3/1997 | Brettschneider | |
| 5,612,730 | A | 3/1997 | Lewis | |
| 5,630,754 | A | 5/1997 | Rebane | |
| 5,655,961 | A | 8/1997 | Acres et al. | |
| 5,664,998 | A | 9/1997 | Seelig et al. | |
| 5,664,999 | A | 9/1997 | Kurihara | |
| 5,697,843 | A | 12/1997 | Manship et al. | |
| 5,697,844 | A * | 12/1997 | Von Kohorn | 463/40 |
| 5,768,382 | A * | 6/1998 | Schneier et al. | 380/251 |
| 5,770,533 | A | 6/1998 | Franchi | |
| 5,779,549 | A | 7/1998 | Walker et al. | |
| 5,788,573 | A | 8/1998 | Baerlocher et al. | |
| 5,947,820 | A | 9/1999 | Morro et al. | |
| 5,971,851 | A * | 10/1999 | Pascal et al. | 463/24 |
| 6,110,041 | A | 8/2000 | Walker et al. | |
| 6,135,885 | A | 10/2000 | Lermusiaux | |
| 6,186,893 | B1 | 2/2001 | Walker et al. | |
| 6,224,486 | B1 | 5/2001 | Walker et al. | |
| 6,234,896 | B1 * | 5/2001 | Walker et al. | 463/16 |
| 6,500,068 | B2 * | 12/2002 | Walker et al. | 463/25 |
| 6,811,482 | B2 | 11/2004 | Letovsky | |
| 6,893,341 | B2 * | 5/2005 | Walker et al. | 463/9 |
| 7,198,572 | B2 * | 4/2007 | Walker et al. | 463/25 |

OTHER PUBLICATIONS

Name That Video, as reported by Angelfire, downloaded Jun. 9, 2010, 1 page.*

Name That Video as reported by Wikipedia, downloaded Jul. 23, 2010, 2 pages.*

Office Action for U.S. Appl. No. 10/882,859 (97-015-C3) dated May 26, 2005. (5 pages).

Notice of Allowance for U.S. Appl. No. 10/882,859 (97-015-C3) dated Dec. 5, 2006. (7 pages).

Office Action for U.S. Appl. No. 09/798,719 (97-015-C1) dated Aug. 14, 2001. (15 pages).

Office Action for U.S. Appl. No. 09/798,719 (97-015-C1) dated Dec. 3, 2001. (5 pages).

Office Action for U.S. Appl. No. 09/798,719 (97-015-C1) dated Mar. 5, 2002. (2 pages).

Notice of Allowance for U.S. Appl. No. 09/798,719 (97-015-C1) dated Mar. 8, 2002. (3 pages).

Notice of Allowance for U.S. Appl. No. 09/798,719 (97-015-C1) dated Jul. 22, 2002. (1 page).

Office Action for U.S. Appl. No. 10/272,554 (97-015-C2) dated Nov. 14, 2003. (4 pages).

Notice of Allowability for U.S. Appl. No. 10/272,554 (97-015-C2) dated Mar. 1, 2005. (2 pages).

International Search Report for Application No. PCT/US98/06474 (97-015WO) dated May 20, 1998. (3 pages).

International Preliminary Examination Report for Application No. PCT/US98/06474 (97-015WO) dated Jan. 19, 1999. (4 pages).

Office Action for U.S. Appl. No. 08/832,723 (97-015) dated May 4, 1998. (1 page).

Office Action for U.S. Appl. No. 08/832,723 (97-015) dated Jul. 8, 1998. (5 pages).

Office Action for U.S. Appl. No. 08/832,723 (97-015) dated Apr. 23, 1999. (3 pages).

Office Action for U.S. Appl. No. 08/832,723 (97-015) dated Dec. 30, 1999. (1 page).

Office Action for U.S. Appl. No. 08/832,723 (97-015) dated Jul. 13, 2000. (1 page).

Notice of Allowability for U.S. Appl. No. 08/832,723 (97-015) dated Jul. 19, 2000. (1 page).

Notice of Allowability for U.S. Appl. No. 08/832,723 (97-015) dated Dec. 1, 2000. (1 page).

Brochure: "Welcome to Video Reality!," Atonic Casino Technology, Oct. 1995. (14 pages).

"IGT Launches Next-Generation Video Gaming Machine," PR Newswire, Aug. 23, 1995, Section: Financial News. (2 pages).

"More 'Dotmation' Slots Hit Tower," Atlantice City Insider, Revealing the Casinos Best-Kept Secrets, Jan. 1997, vol. 1. (2 pages).

* cited by examiner

CASINO PLAYER DATABASE 40

| NAME | PLAYER ID NUMBER | ADDRESS | PREFERRED VIDEO CATEGORIES |
|---|---|---|---|
| BOB SMITH | 4356-ABC | 124 MAIN ST. ANYTOWN | COMEDY |
| DOUG JONES | 1234-FVT | 345 MAIN ST. SOMETOWN | SPORTS |
| | | | |

FIG. 4

GAMING SESSION DATABASE 42

| SLOT MACHINE ID NUMBER | SLOT MACHINE TYPE | PLAYER ID NUMBER | VIDEO CATEGORY | VIDEO ID NUMBER | AMOUNT OF CLIP VIEWED ALREADY | OUTPUT DEVICE |
|---|---|---|---|---|---|---|
| RIXSCPU | BALLY 2A | 4356-ABC | SPORTS | SP2345 | 2 MINS. 46 SECONDS | VIDEO SCREEN |
| 50BGCRP | IGT 45DE | 1234-FVT | ADVENTURE | AD5643 | 31 SECONDS | VR GOGGLES |
| | | | | | | |

FIG. 5

VIDEO DATABASE 44

| VIDEO ID NUMBER | CATEGORY | TITLE | LENGTH (TIME) |
|---|---|---|---|
| SP2345 | SPORTS | 1996 BASEBALL HIGHLIGHTS | 20 MINUTES |
| AD5643 | ADVENTURE | AMAZON JOURNEY | 15 MINUTES |
| | | | |

FIG. 6

SLOT MACHINE PAYOUT TABLE 36

| REEL OUTCOME | 1 COIN | 2 COINS | 3 COINS |
|---|---|---|---|
| BAR/BAR/BAR | 50 | 100 | 150 |
| CHERRY/CHERRY/CHERRY | 25 | 50 | 75 |
| LEMON/LEMON/LEMON | 15 | 30 | 45 |
| BELL/BELL/BELL | 10 | 20 | 30 |
| BAR/BAR/CHERRY | 5 | 10 | 15 |
| CHERRY/CHERRY/BAR | 1 | 2 | 3 |
| BELL/BELL/LEMON | 30 SEC. VIDEO | 60 SEC. VIDEO | 90 SEC. VIDEO |
| PEACH/PEACH/BELL | 15 SEC. VIDEO | 30 SEC. VIDEO | 45 SEC. VIDEO |
| ALL OTHERS (LOSING COMBINATIONS) | 10 SEC. VIDEO | 20 SEC. VIDEO | 30 SEC. VIDEO |

FIG. 7

SLOT DRIVEN VIDEO STORY

RELATED APPLICATIONS

The present application is a continuation of U.S. patent application Ser. No. 10/882,859, filed Jul. 1, 2004 in the name of Walker et al. and entitled SLOT DRIVEN VIDEO STORY;

which is a continuation of U.S. patent application Ser. No. 10/272,554, filed Oct. 16, 2002 in the name of Walker et al. and entitled SLOT DRIVEN VIDEO STORY, which issued as U.S. Pat. No. 6,893,341 on May 17, 2005;

which is a continuation of U.S. patent application Ser. No. 09/798,719, filed Mar. 2, 2001 in the name of Walker et al. and entitled SLOT DRIVEN VIDEO STORY, and which issued as U.S. Pat. No. 6,500,068 B2 on Dec. 31, 2002;

which is a continuation of U.S. patent application Ser. No. 08/832,723, filed Apr. 11, 1997 in the name of Walker et al. and entitled SLOT DRIVEN VIDEO STORY, and which issued as U.S. Pat. No. 6,234,896 B1 on May 22, 2001.

The present application is also related to U.S. patent application Ser. No. 11/677,943 filed on Feb. 22, 2007 in the name of Walker et al. and entitled SLOT DRIVEN VIDEO STORY.

FIELD OF THE INVENTION

This invention relates to a gaming system which provides a payout for each play and, more particularly, to a system which selectively provides a video presentation to a user, as a form of non-monetary compensation, in accordance with criteria such as player identification data and a gaming result.

BACKGROUND OF THE INVENTION

Slot machines provide an important source of revenue for the gaming industry. For that reason, gaming establishments constantly search for new gaming strategies and features to provide additional incentives for slot machine players to continue play. Some gaming devices now provide video or graphical information to entertain a player during play. For instance, some slot machines provide “Dotmation”, a computer controlled LED display, that ties a game to an animated character. Such a system is currently utilized in “Piggy Bankin”, wherein a pig dances around an LED display screen as the slot machine play ensues.

Another approach is found in U.S. Pat. No. 5,259,613, entitled “Casino and Entertainment Systems”, wherein gaming devices are furnished with audio/video communication equipment that is connected to a central control station. The control station selectively engages in both voice and video communication with the players at each individual slot machine. Live sporting events and even daytime soap opera television can be displayed.

It is also known that some gaming devices provide an increased probability of winning to attract players. For example, U.S. Pat. No. 5,423,539 (Nagao) entitled “Slot Machine with Payout Modifying Symbols” describes a gaming device in which a player wins by obtaining a certain combination of characters associated with a winning table (e.g., the various winning combinations). The gaming system includes a wild card which may be substituted for any character and, thus, increases the probability of a player receiving a winning combination of characters.

Gaming devices have also been known to provide complimentary points for players who are members of slot clubs. These slot clubs provide the player with a slot tracking card which when inserted into the slot machine rewards the player with comp points for each handle pull or game play. These points, which may be redeemed for some prize or gift, are part of casino programs used to attract players. Complimentary points are automatically provided to a player simply for initiating a gaming play, (e.g., paying a monetary sum to begin a play), but do not form part of the prize structure of the underlying game. In other words, complimentary points are provided to a player regardless of the gaming result. In most cases, the monetary sum paid by the player into the slot machine determines the amount of complimentary points to be provided by the casino.

There is a continuing desire on the part of gaming establishments to enhance the playing and winning experience at slot machines with video or graphic information.

SUMMARY OF THE INVENTION

Accordingly, it is an object of the invention to provide a gaming device which contains a payout table which results in a player receiving a “payout” for every possible gaming result.

A further object of the invention is to provide a system for provision of a video presentation to slot machine players, wherein the video presentation is output as a form of a low-level non-monetary winning.

A further object of the invention is to provide a gaming system, wherein a player can terminate a video presentation at a gaming device and can resume display of the video presentation from the point of termination, at another time or gaming device.

A further object of the invention is to provide a gaming device for provision of a video presentation wherein the video presentation can be used as part of a skill-game puzzle, with a prize structure separate from the gaming device.

A further object of this invention is to provide a gaming system which provides a payout, either as a monetary award or as a displayed video presentation, on each play, based on a set of payout conditions.

A gaming system includes a network server connected to a plurality of gaming devices that are adapted to provide a video payout on each play based on a set of payout parameters. Memory at each gaming device stores payout parameters that correspond to each possible gaming result or outcome. When a play is initiated by a player, a gaming result is generated at a gaming device. The gaming device responds by accessing a corresponding payout parameter from the memory which may be a monetary amount, a video presentation segment or a combination thereof. If the payout is video, the network server receives the payout parameter and transmits a video presentation segment to the gaming device accordingly. The gaming device then provides a video payout, in the form of a displayed video presentation, to the player. The player thus receives at least one form of payment on each play.

BRIEF DESCRIPTION OF THE DRAWINGS

FIG. 4 is a schematic diagram of a player database maintained in the network server.

FIG. 5 is a schematic diagram of a session database maintained in the network server.

FIG. 6 is a schematic diagram of a video database maintained in the network server.

FIG. 7 is a schematic diagram of a payout table database maintained in the slot machine.

DETAILED DESCRIPTION OF THE INVENTION

Before proceeding with a detailed description of a preferred embodiment of the present invention, it is well to define certain terms as used herein. Although the embodiments discussed herein are directed to slot machines, it is to be understood that the present invention is equally applicable to other gaming devices, such as video poker machines, video blackjack machines, video roulette machines, video keno machines, video bingo machines, and the like.

The term "video presentation" or "video information" when used to describe a payout refers to a movie, music video, soap opera, sporting event, or video entertainment material. This video information is presented via a video display.

The term "resume code" will be used hereafter to refer to data, provided to a player upon a termination of a video presentation, which allows the player to resume display of the video presentation at another time or gaming device. That is to say, in certain cases, a player may desire to terminate display of the video presentation before the entire video presentation has been viewed. In such a case, the resume code allows a player to continue display of the video presentation, from the point of termination, at another time or gaming device. The resume code may take the form of any combination of characters (e.g., ABCD1, $%j1, etc.).

Figure 1:
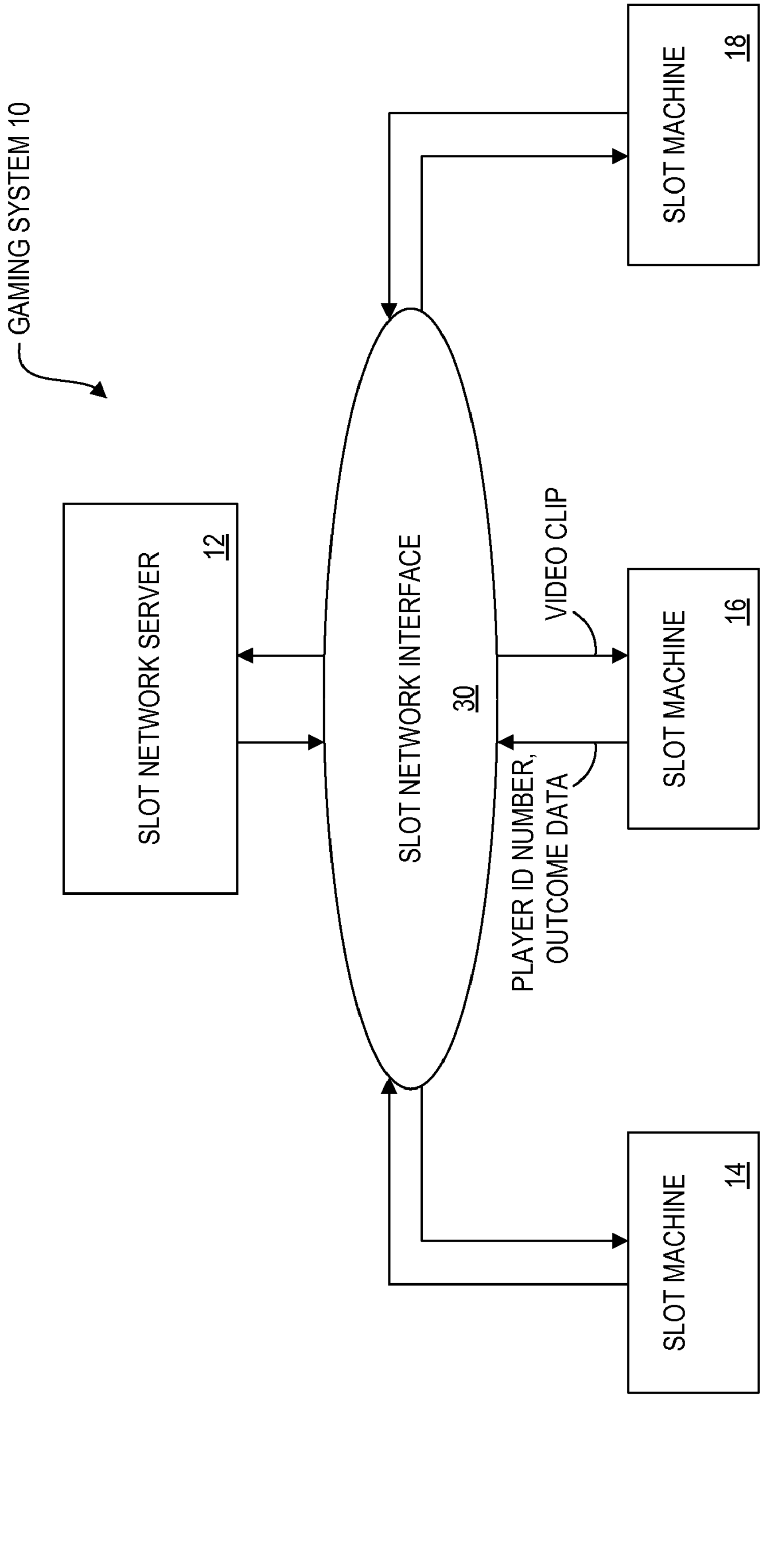
FIG. 1 is a block diagram of a network with a network server that cooperates with a plurality of slot machines to provide video payouts to players for each slot machine play.

FIG. 1 is a block diagram of a gaming system 10 in accordance with the present invention. Gaming system 10 includes a network server 12 which is connected to a plurality of slot machines 14, 16, 18 via a slot network interface 30. Each slot machine 14, 16, 18 is adapted to receive player data, (e.g., a Player ID Number), and to generate a gaming result and a corresponding payout parameter for each play. The player data and payout parameters from each slot machine 14, 16, 18 are respectively transmitted to network server 12, via network interface 30.

Network server 12 receives the player data and payout parameters and selects a video presentation for each respective slot machine based on the player data and payout parameters. The selected video presentation is then transmitted, via slot network interface 30, to the appropriate slot machine 14, 16, 18 for display. Instead of storing the video presentation in network server 12 and transmitting the video information to slot machine 14, 16, 18, the video information can be stored locally in each slot machine 14, 16, 18 for subsequent display.

Figure 2:
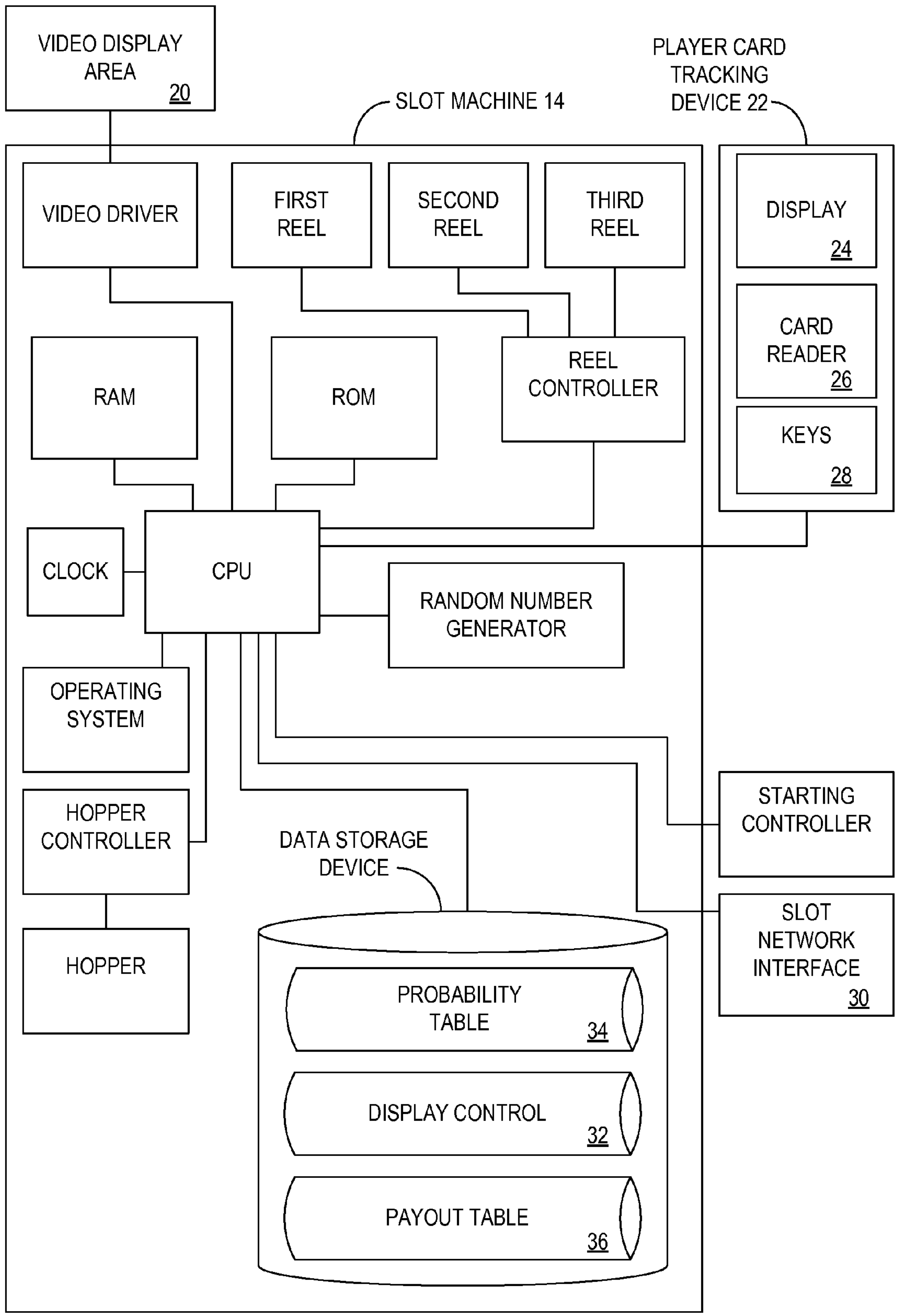
FIG. 2 is a block diagram of a slot machine with video capability.

FIG. 2 illustrates a block diagram of a slot machine 14. Slot machine 14 is configured in a manner known in the prior art, except for a display control subroutine 32, a probability database 34 and a payout database 36. Player tracking device 22 includes a display 24, a card reader 26 and buttons 28 ("soft" or "hard") for enabling a player to input data into slot machine 14. It should be noted that "buttons" can refer to a touchscreen button or a physical button on the outside of the machine casing. A video display area 20 may also be provided in slot machine 14, but may not be externally accessed by network server 12. If this is the case, display 24 is used to display downloaded video information (e.g., movies, music videos, etc.) and further messages to the player. Each of the remaining submodules within slot machine 14 is known to those skilled in the art and requires no detailed discussion.

Display control subroutine 32 controls the operation of tracking device 22, including card reader 26 and buttons 28. When a player inputs a selection or other data via buttons 28, such entry is recognized by display control subroutine 32, which causes the resident CPU in slot machine 14 to configure the entered data for transmission over slot network interface 30 to network server 12.

Figure 3:
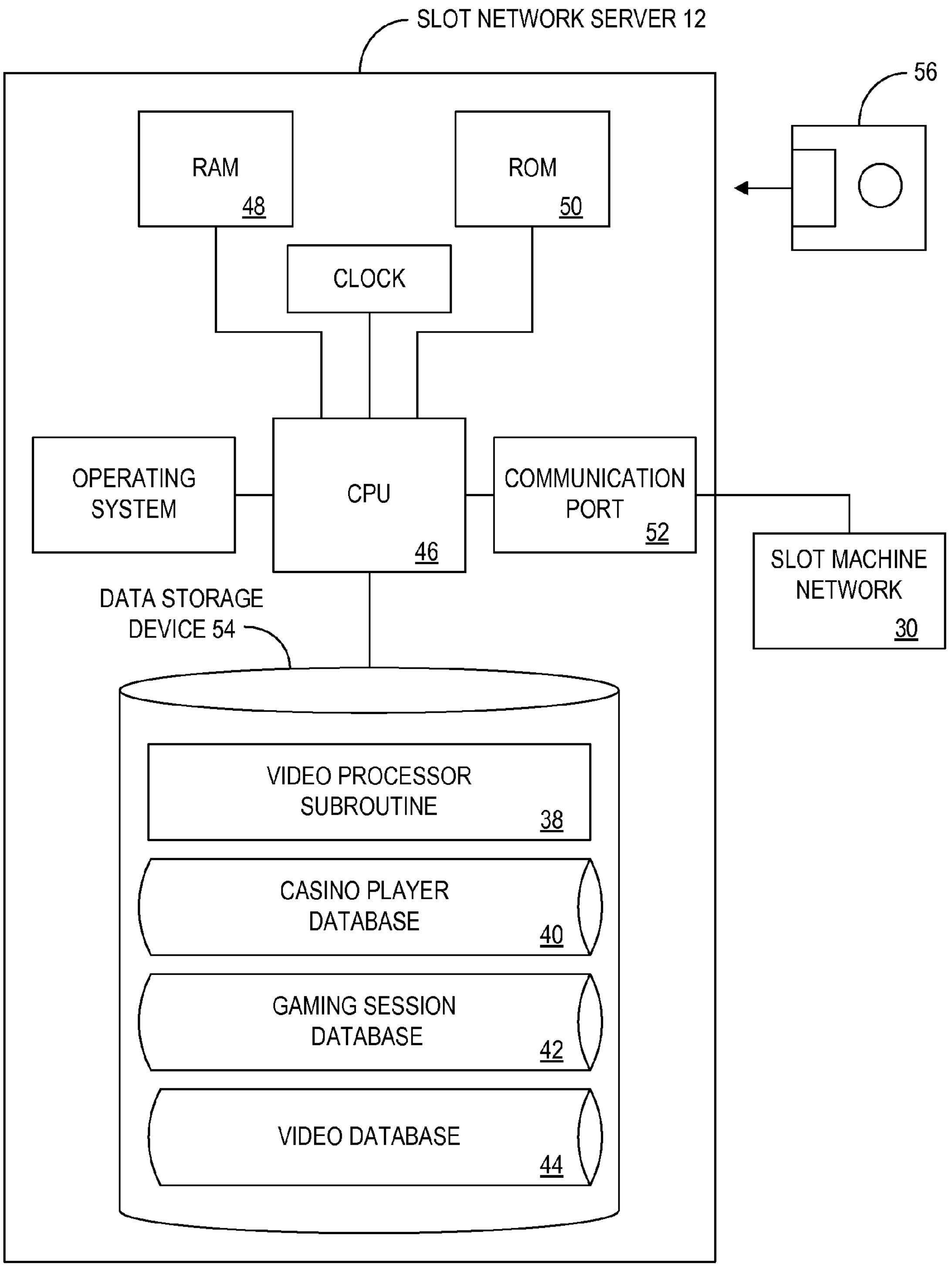
FIG. 3 is a block diagram of the slot network server.

Network server 12 includes a video processor subroutine 38 which is stored therein or which can be loaded thereinto via a magnetic disk 56 (FIG. 3). The video processor subroutine 38, in combination with the network server hardware, provides control and updating of connected databases, and selection and transmission of video presentation material to connected slot machines. The video processor subroutine 38 further processes input signals from the players at the respective slot machines.

FIG. 3 illustrates a block diagram of a representative network server 12. Network server 12 includes a central processor unit (CPU) 46 which is coupled to a random access memory (RAM) 48, a read only memory (ROM) 50 and a communication port 52 which provides interconnection to slot machine interface 30. A data storage device 54 provides memory capacity for a video processor subroutine 38, a casino player database 40, a gaming session database 42 and a video database 44.

A schematic illustration of the contents of the casino player database 40 is found in FIG. 4 and preferably includes Name; Player Identification (ID) Number; Address; and Preferred Video Categories. Most of the contents of player database 40 are self explanatory and require no further description. The Preferred Video Categories identifies types of video information, (e.g., sports, adventure, etc.). In essence, player database 40 provides sufficient information to enable network server 12 to perform the invention hereof without requiring any further data from the player.

Gaming session database 42 is schematically shown in FIG. 5 and includes the following data:

Slot Machine Identification (ID) Number;
Slot Machine Type;
Player ID Number;
Video Category;
Video Identification (ID) Number;
Amount of Clip Viewed Already; and
Output Device.

Most of the contents of session database are self-explanatory and require no further description. Slot Machine Type identifies the make and model of the slot machine being played. Video ID Number identifies a particular video previously viewed by the player. "Amount of Clip Viewed Already" indicates how much of the video information has been previously viewed by the player. Output Device indicates the type of display device used for each particular video information source (e.g., display screen, Virtual-Reality glasses, etc.).

Video database 44 is shown in FIG. 6 and has fields including Video ID Number, Category, Title and Length(time). Video ID Number identifies a particular video presentation. Category classifies the type of video presentation, (e.g., action, sports, etc.) Title is the title of each video presentation. Finally, Length(Time) indicates the length of time of the entire video presentation.

FIG. 7 schematically illustrates a payout database 36 and includes Reel Outcome, 1 Coin, 2 Coins and 3 Coins fields. The Reel Outcome field identifies all possible permutations of gaming results for slot machine 14. The 1 Coins through 3 Coins fields correspond to payout parameters (e.g., predetermined payout) associated with each possible gaming result. That is to say, every possible combination of gaming outcome in the Reel Outcome field is associated with a payout parameter, thereby ensuring that each slot machine play results in payout, (e.g., at least a presentation of video information.) For instance, a player, inserting three coins and receiving a gaming result of 2 Bells & a Lemon, will receive 45 seconds worth of a video presentation.

Before proceeding with a description of the operation of the first embodiment of the invention, it should be understood that in a preferred embodiment, each slot machine is configured to provide at least a video payout (e.g., a video presentation), on each slot machine play, in addition to conventional payouts (e.g., a monetary sum) that are commonly provided by slot machines. Therefore, a player always wins at least a video payout on each play. In alternate embodiments, the invention includes payouts of video information as the only payout, and/or video payouts supplemental to normal cash payouts but without a win on every play.

Turning now to FIGS. 8 through 11, the operation of the first embodiment of the invention will be described. Initially, each slot machine 14, 16, 18 has had loaded and stored therein probability table 34, payout table 36 and display control subroutine 32. The network server 12 also has had loaded and stored therein video processor subroutine 38 player database 40, session database 42 and video database 44. Such stored databases enable network server 12 to selectively provide a video presentation to players at each individual slot machines 14, 16, 18.

Figure 8:
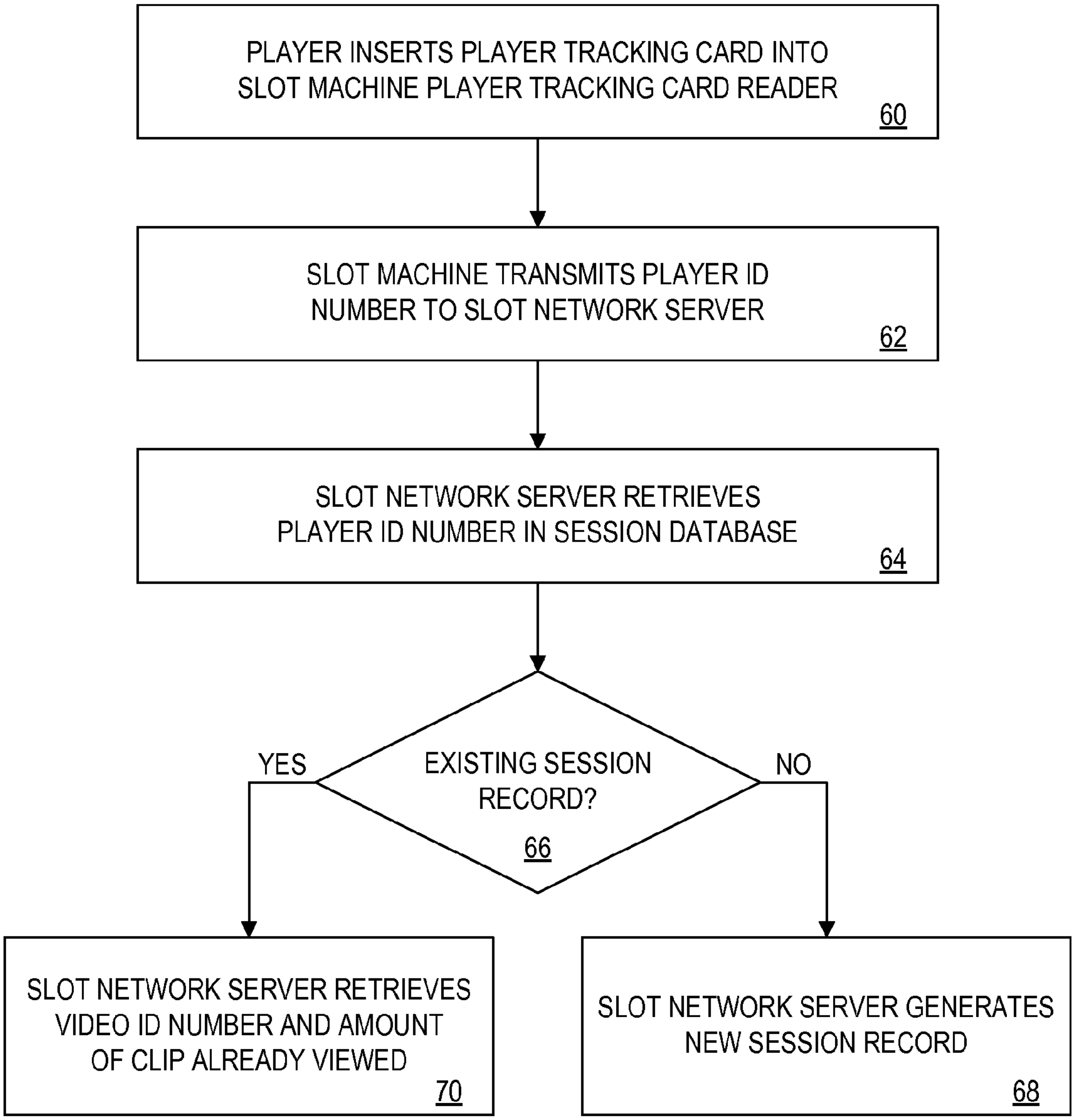
FIG. 8 illustrates a logic flow diagram of the initiation of a slot machine play.

As shown in FIG. 8, a player begins a slot machine play session by inserting a player tracking card (not shown) into card reader 26 of slot machine 14 (Box 60). The player tracking card stores at least a Player ID Number and may also store monetary credit information. Slot machine 14 transmits the Player ID Number to network server 12 over slot network interface 30 (Box 62). Network server 12 receives the Player ID Number, accesses session database 42 (Box 64) and determines whether a session record exists for the Player ID Number (Box 66). If a session record exists, network server 12 retrieves the Video ID Number and Amount of Clip Already Viewed that are associated with the Player ID Number (Box 70). Otherwise, network server 12 generates a new session record in session database 42, for the new Player ID Number (Box 68). Such an arrangement allows a player to resume display of a video presentation at a future play session and, thus, provides additional incentive for a player to resume slot machine play.

While not shown in FIG. 8, slot machine 14 may utilize other methods for receiving player data. For instance, a player can manually input a resume code or Player ID Number (as described above), instead of utilizing a player tracking card. The resume code or Player ID Number would be provided to a player upon a termination of a video presentation by the player. A player can then input the resume code or Player ID Number, via buttons 28, at another time or gaming device and resume display of the video presentation from the point of termination. As with the player tracking card embodiment described above, the player provided Player ID Number or resume code is likewise transmitted to network server 12 for processing.

Figure 9:
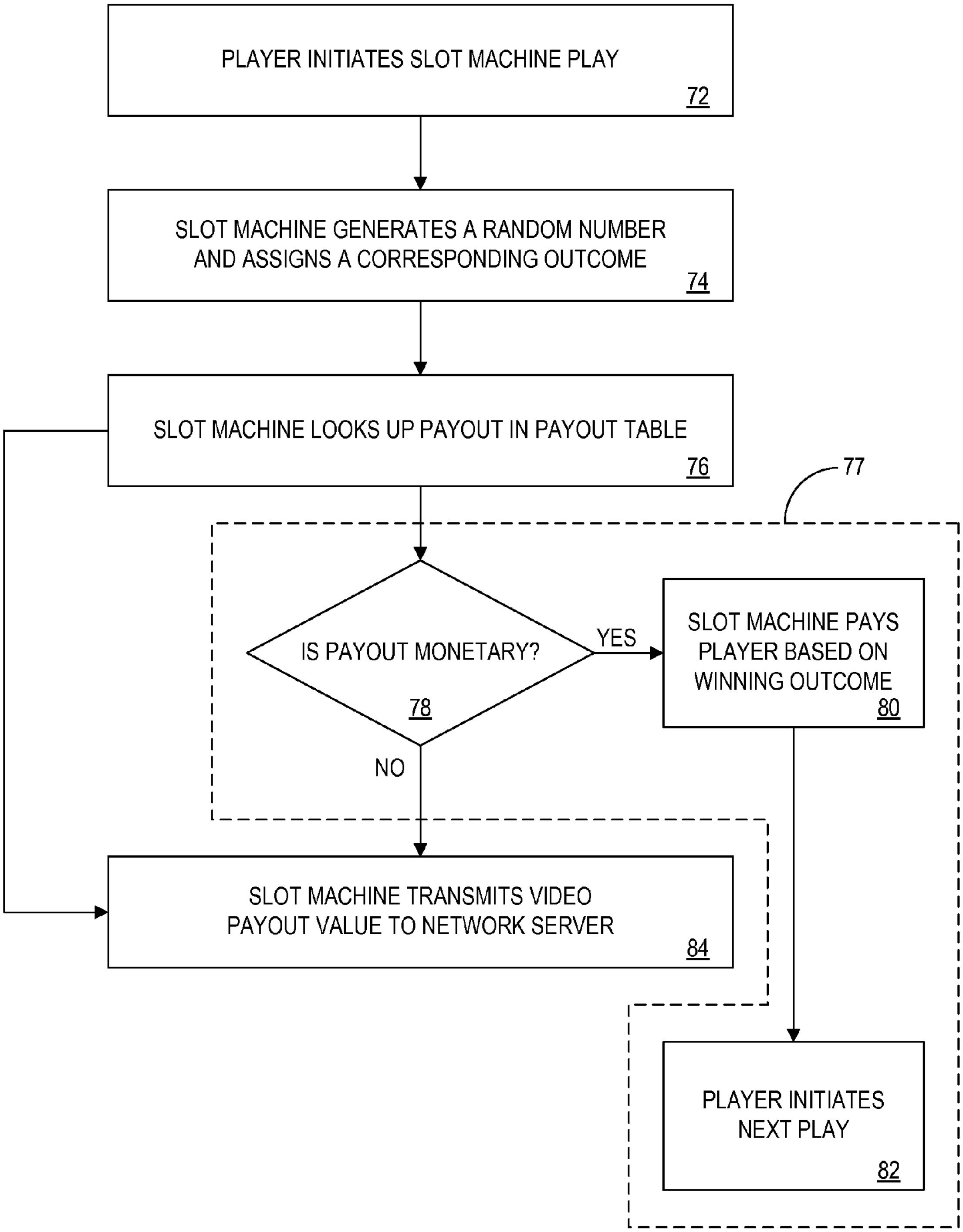
FIGS. 9 through 11 illustrate a logic flow diagram of the operation of a slot machine play.
Figure 10:
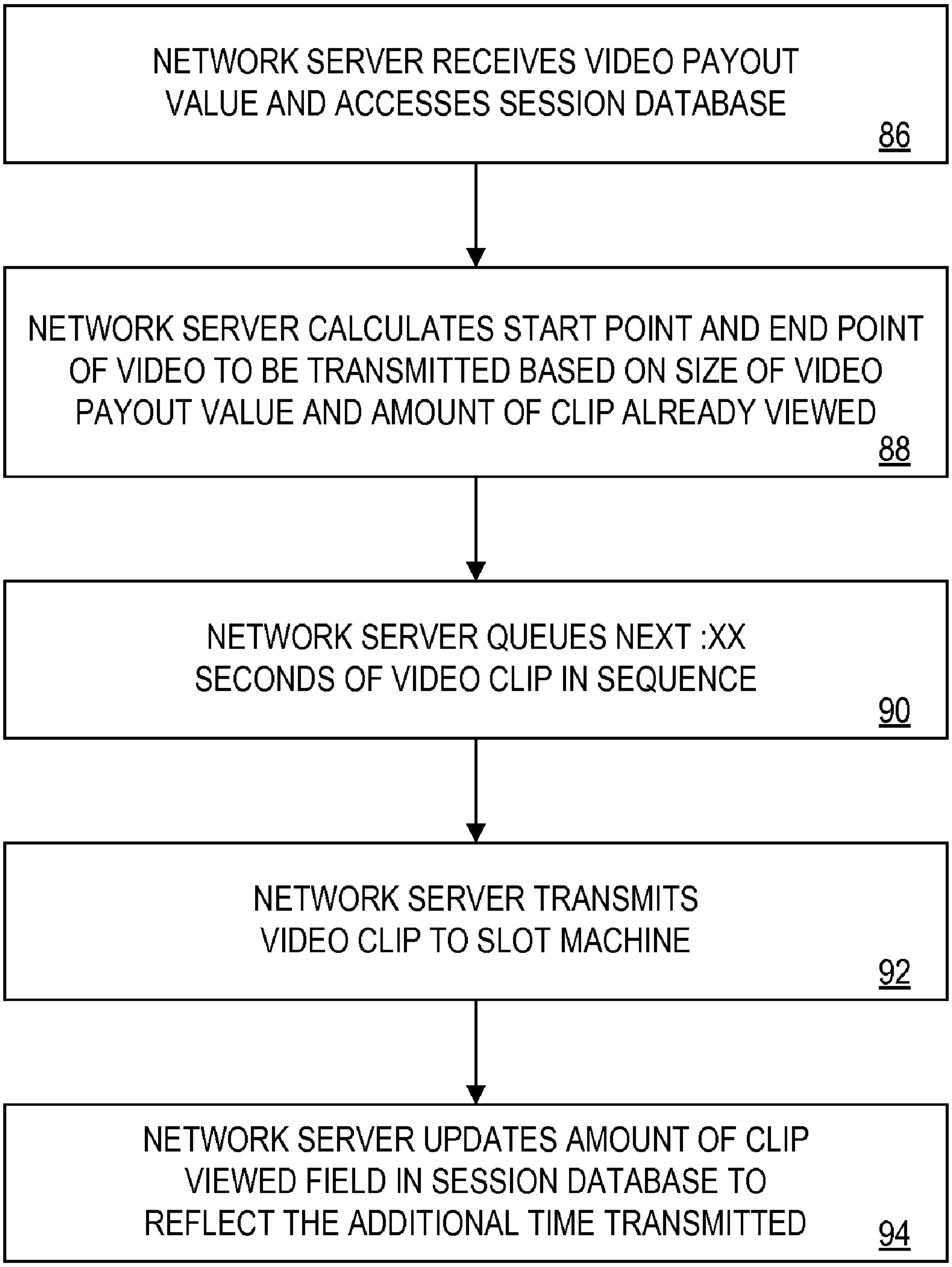
Figure 11:
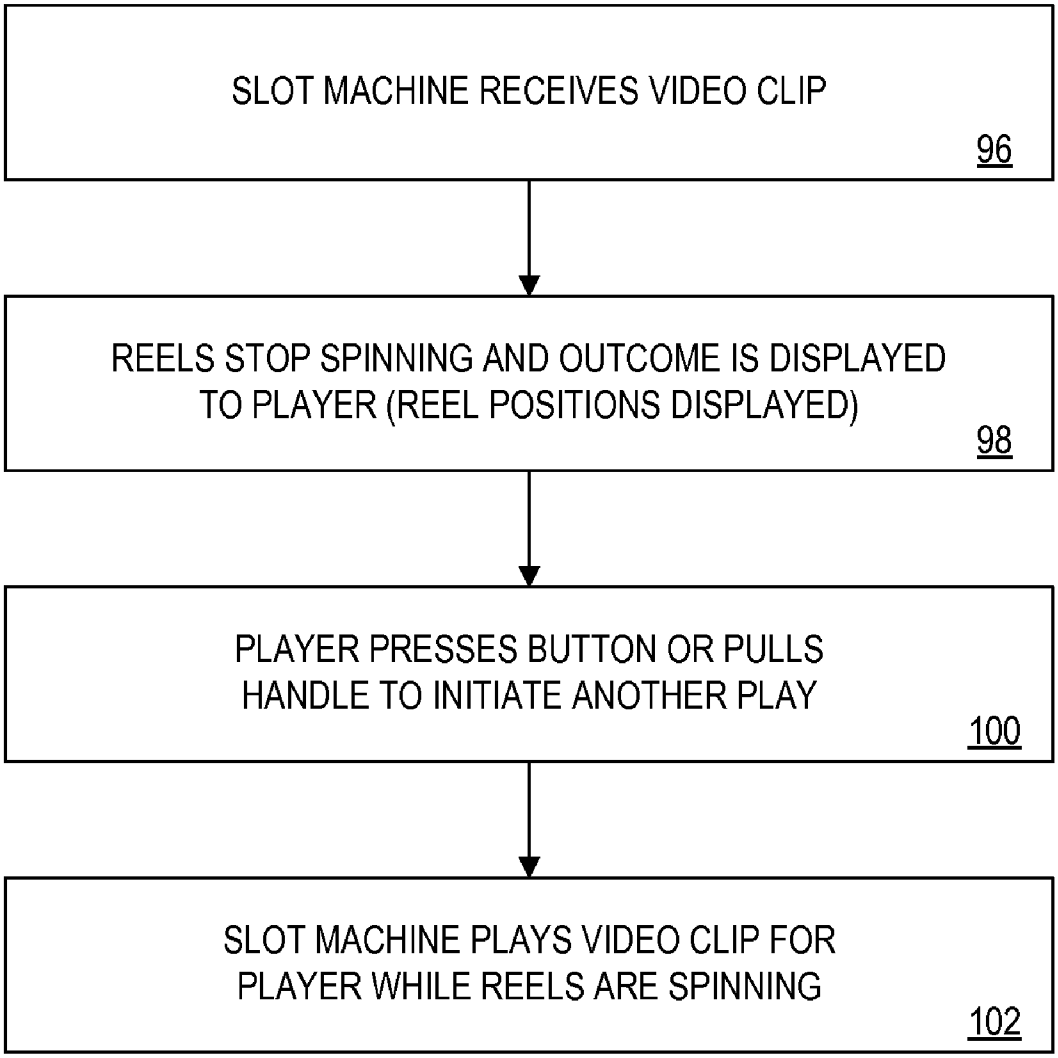

Thereafter, a player can commence slot machine play, as shown in FIGS. 9 through 11. A player initiates a slot machine play by pulling a handle or pushing a "spin reels" button (Box 72). Slot machine 14 then generates a random number and assigns a corresponding outcome to the random number (Box 74). The CPU of slot machine 14 accesses payout database 36, locates the particular gaming result under Reel Outcome field and assigns a corresponding payout parameter from either the 1 Coin, 2 Coins or 3 Coins field accordingly (Box 76). The payout parameter is then transmitted to network server 12.

Network server 12 receives the payout parameter and accesses session database 42 (Box 86). Based on the Player ID Number, network server 12 selects a video presentation accordingly. For example, the network server would select video presentation SP2345, a sports video, for Player ID Number 4356-ABC.

Network server 12 (FIG. 10) then calculates a start point and an end point of video presentation to be transmitted to slot machine 14 based on the payout parameter (e.g., 45 seconds of video presentation) and an amount of video presentation already viewed by the player (Box 88). Other gaming results or player factors may also be considered in calculating the length of video presentation. For example, the length of a play session or player status (e.g., preferred player) could extend the length of the presentation.

Network server 12 then queues the next portion of the video presentation in sequence for transmission (Box 90) and transmits the video presentation to slot machine 14 (Box 92). After transmission, the Amount Of Clip Viewed field of session database 42 is updated to reflect the additional time period of transmitted video presentation (Box 94).

Thereafter, slot machine 14 receives the video presentation from network server 12 (Box 96) and the reels stop spinning to display the gaming result to the player (Box 98). The video presentation is then displayed on display 24 of slot machine 14 (Box 102), and a player can initiate the next slot machine play (Box 100), as the video presentation is displayed. Note that a player continuously playing a slot machine (e.g., initiating one slot machine play after another) will receive a continuous video stream of video presentation.

In a second embodiment of the present invention, slot machine 14 utilizes the video presentation to provide an additional puzzle-type game. Each video presentation portion (e.g., video clip) displayed to the player upon a non-monetary payout parameter provides a clue for solving a puzzle. The puzzle may be a murder mystery, trivia game, etc. After each displayed video presentation portion, the player is instructed over display 24 to solve the puzzle, for example, by selecting one of multiple answer choices which is then compared with a pre-defined answer or player input associated with the displayed video presentation. Such a gaming feature may be a form of payout in itself or may provide a prize structure of its own.

In the preferred embodiment of the present invention, slot machine 14 provides either a monetary payout or a video payout, for each slot machine play. The payout is based on the gaming result and the corresponding payout parameter from payout database 36. Note that the video payouts are provided for each gaming result that typically provides no monetary payout, (e.g., a losing gaming result or outcome.) For instance, a gaming result corresponding to 3 Bars would result in a monetary payout to the player, whereas 2 Peaches & 1 Bell would result in a video payout to the player.

Payout database 36 (FIG. 7) is adapted to include monetary payout parameters and video payout parameters. Each possible gaming result or combination in payout database 36 has a corresponding payout parameter, either as a monetary payout parameter (e.g., cash or credit) or a video payout parameter (e.g., video presentation).

Slot machine 14 is adapted to identify an occurrence of a monetary payout parameter as compared to a video payout parameter and to provide a corresponding payout to the player. Referring to FIG. 9, such an arrangement is accomplished by incorporating additional steps to the operation of the invention described above, as indicated by the reference number 77 (FIG. 9). Specifically, after a gaming result is generated and a corresponding payout parameter is selected from payout database 26 (Boxes 74, 76), slot machine 14 determines whether the payout parameter is a monetary payout parameter or a video payout parameter (Box 78).

If the payout parameter is monetary, slot machine 14 can issue the monetary payout, either as cash or locally stored machine credits (Box 80). Cash can be directly dispensed to the player or credited to an account maintained locally at the machine or remotely at the server. In any case, after a monetary payout is issued, a player can then initiate the next slot machine play (Box 82).

If the payout parameter is a video payout, slot machine 14 transmits the payout parameter to network server 12 (Box 84). At this point, network server 12 performs the same operations as those described above for the first embodiment (FIGS. 10 and 11), namely, selecting a segment of video presentation and transmitting it back to slot machine 14 for display.

Although slot machine 14, in this case, provides either a video payout or a monetary payout, other payouts or combination of payouts may also be provided. Such payouts may include a free play, frequent flyer miles, etc. Payout database 36, likewise, would be adapted to include additional payout parameters; and gaming system 10 would be configured to provide these additional forms of payment. For example, frequent flyer miles could be provided in the same manner as monetary credits. In each case, however, the payout, its type and amount is derived from the payout database, (e.g., a payout table), and may also be dependent upon the Player ID Number.

Figure 12:
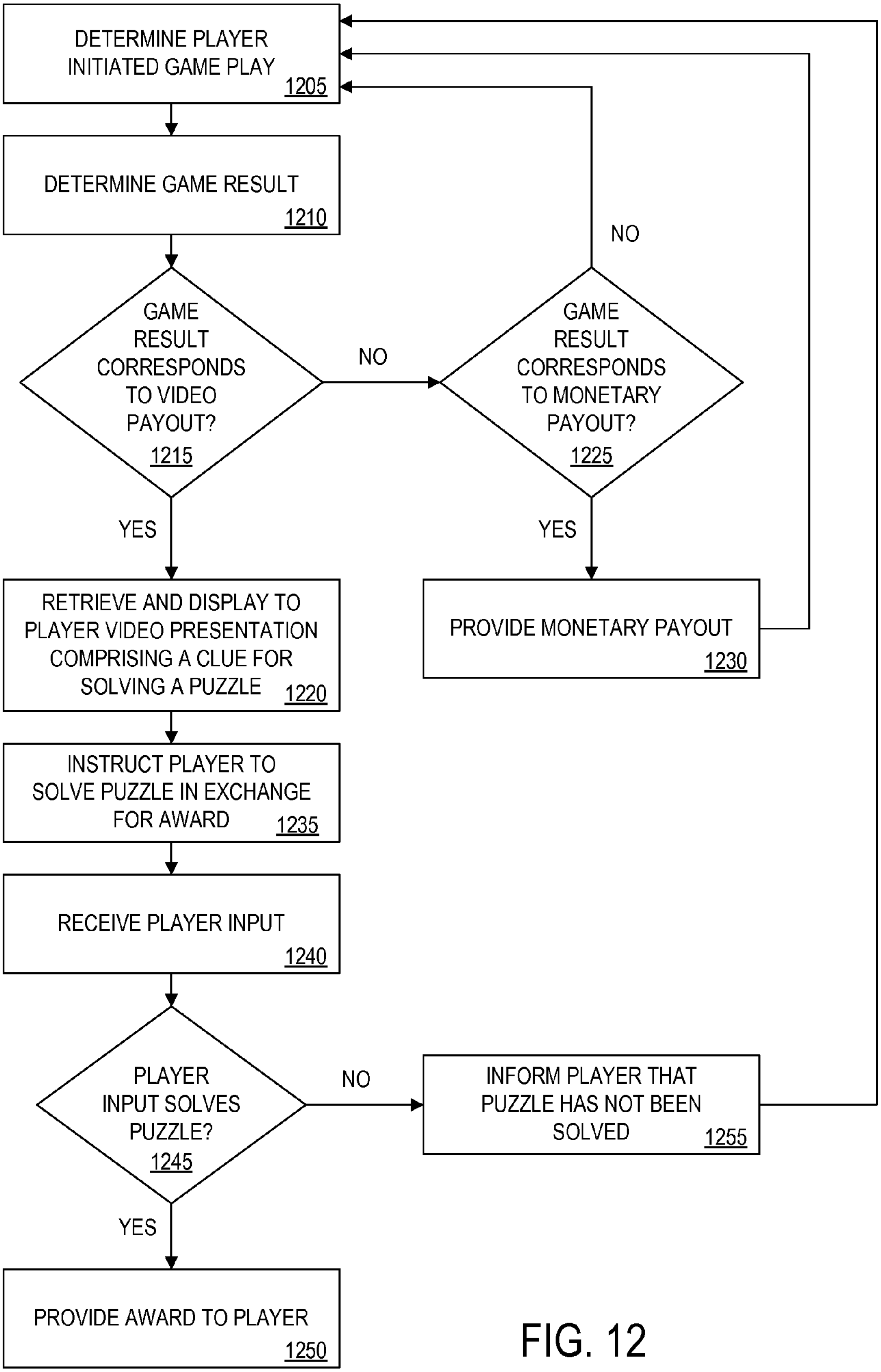
FIG. 12 is a flow chart illustrating a method in accordance with one embodiment of the present invention.

Referring now to FIG. 12, a flow diagram illustrates an exemplary process according to an embodiment of the present invention. The process begins with step 1205, wherein a player initiated game play is determined. The game result is then determined in step 1210. It is then determined, in step 1215, whether the game result correspond to video output. If the game result does not correspond to video output, it is determined in step 1225 whether the game result corresponds to monetary payout. If the game result does correspond to monetary payout, the process proceeds to step 1230, where the monetary payout is provided. The process then returns to step 1205, where a player initiated game play is again determined. If the game result does not correspond to monetary payout, the process also returns to step 1205, where a player initiated game play is again determined.

If, in step 1215, it is determined that the game result does correspond to video output, the process proceeds to step 1220, where video presentation comprising a clue for solving a puzzle is retrieved and displayed to a player. In step 1235, the player is instructed to solve the puzzle in exchange for an award. A player input is received in step 1240. It is then determined, in step 1245, whether the player input solves the puzzle. If the player input does solve the puzzle, the award is provided to the player in step 1250. If the player input does not solve the puzzle, the process continues instead to step 1255, in which step the player is informed that the puzzle has not been solved. The process then returns to step 1205, wherein a player initiated game play is again determined.

Figure 13:
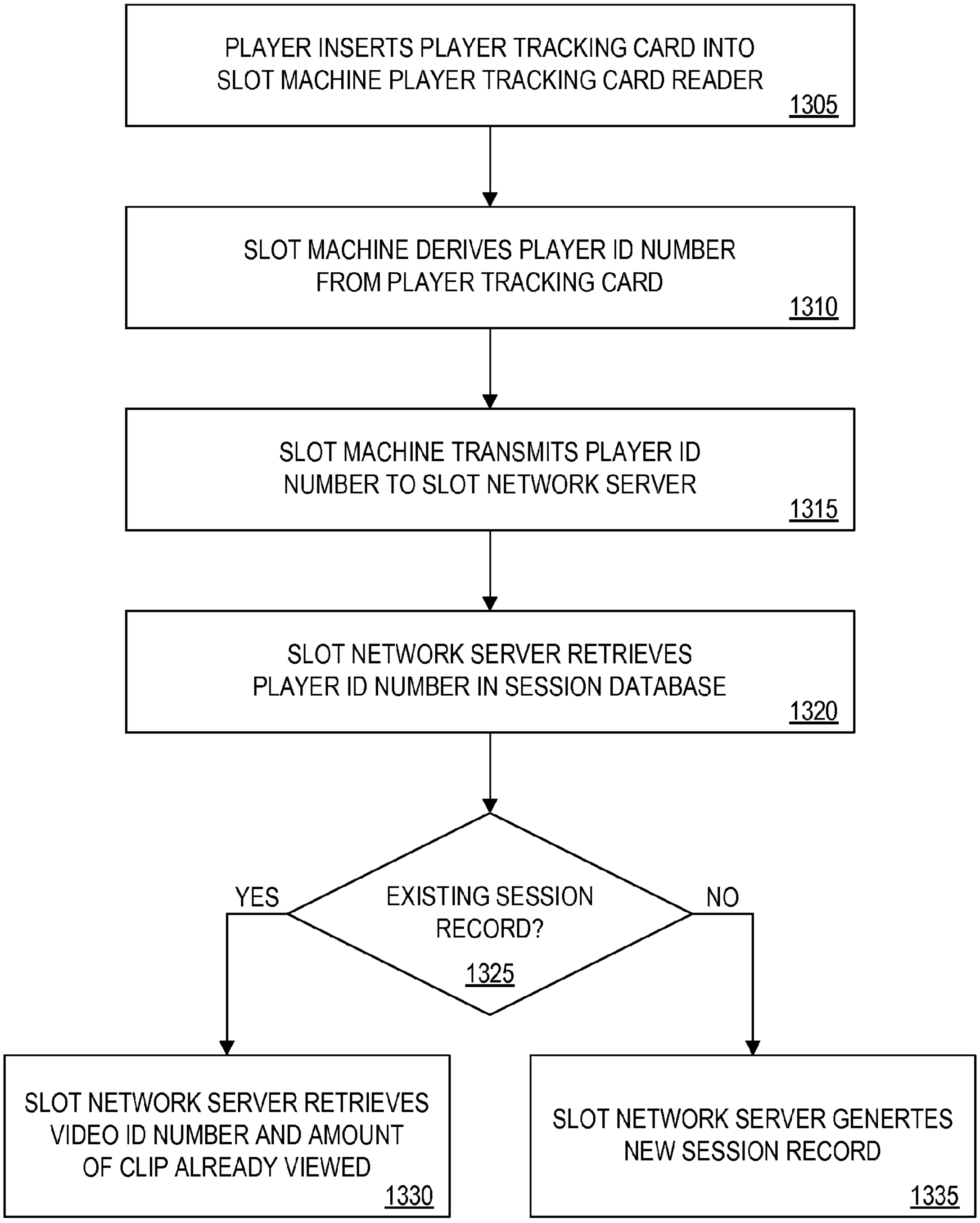
FIG. 13 is a flow chart illustrating a method in accordance with another embodiment of the present invention.

Referring now to FIG. 13, a flow diagram illustrates an exemplary process according to another embodiment of the present invention. The process begins with step 1305, in which step the player inserts a player tracking card into a slot machine player tracking card reader. The slot machine then derives the player ID number from the player tracking card in step 1310. In step 1315, the slot machine transmits the player ID number to a slot network server. The slot network server, in step 1320, retrieves the player ID number from in a session database. In step 1325 it is determined whether there is an existing session record. If there is an existing session record, the slot network server, in step 1330, retrieves a video ID number and amount of clip already viewed. If a session record does not exist, the slot network server, in step 1335, generates a new session record.

In summary, the present invention provides a gaming system wherein a player always wins a prize, in the form of selected video presentation (e.g., a movie, music video, etc.), for each play of a gaming device. The prize structure is based on the gaming result or outcome generated during the play. Such a gaming system may also provide other prizes such as a monetary sum, frequent flyer miles, a free pull, etc.

It should be understood that the forgoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of operating a gaming device including a plurality of instructions, said method comprising:

(a) causing a processor to execute the plurality of instructions to determine an outcome associated with a play of a game at the gaming device, the determined outcome being one of:
  (i) a first outcome corresponding to:
    (A) an award value greater than zero; and
    (B) one of a plurality of video presentations which is displayed in addition to any display of the play of the game, said video presentation including content which is distinct and independent from:
      (1) any outcome determination associated with the play of the game;
      (2) any award determination associated with the play of the game; and
      (3) any value of any determined award;
  (ii) a second outcome corresponding to:
    (A) no award value greater than zero; and
    (B) one of said plurality of video presentations which is displayed in addition to any display of the play of the game, said video presentation including content which is distinct and independent from:
      (1) any outcome determination associated with the play of the game;
      (2) any award determination associated with the play of the game; and
      (3) any value of any determined award; and
  (iii) a third outcome corresponding to:
    (A) an award value greater than zero; and
    (B) no display of one of the plurality of video presentations;
(b) if the determined outcome is the first outcome:
  (i) causing the at least one processor to execute the plurality of instructions to cause a portion of less than all of the content the video presentation corresponding to the first outcome to be displayed; and
  (ii) causing the at least one processor to execute the plurality of instructions to cause the award value corresponding to the first outcome to be provided;

(c) if the determined outcome is the second outcome, causing the at least one processor to execute the plurality of instructions to cause a portion of less than all of the content of the video presentation corresponding to the second outcome to be displayed; and (d) if the determined outcome is the third outcome, causing the at least one processor to execute the plurality of instructions cause the award value corresponding to the third outcome to be provided.

2. The method of claim 1, wherein the determination of the portion of the content of the video presentation to be displayed is based on at least one previously displayed portion of the video presentation and the outcome associated with the play of the game.

3. The method of claim 1, further including storing the video presentation.

4. The method of claim 3, wherein storing the video presentation includes storing the video presentation at the gaming device.

5. The method of claim 3, wherein storing the video presentation includes storing the video presentation at a server positioned remotely from the gaming device.

6. The method of claim 1, further including causing at least one display device to display the content of the video presentation to a player.

7. The method of claim 6, wherein causing the at least one display device to display the content of the video presentation to the player is separate from an indication of the outcome.

8. The method of claim 7, wherein causing the at least one display device to display the content of the video presentation to the player separate from the indication of the outcome includes causing a first display device to display the indication of the outcome in a first game play area and causing a second display device to display the content of the video presentation in a separate second video presentation area of the gaming device.

9. The method of claim 1, wherein the content of the video presentation is selected from at least one of the group consisting of: a movie, a music video, a soap opera, and a sporting event.

10. A system comprising:

an input device;

a processor;

a display device; and a memory device, said memory device storing a plurality of instructions, which when executed by the processor, cause the processor to operate with the display device and the input device to:

(a) determine an outcome associated with a play of a game, the determined outcome being one of:

(i) a first outcome corresponding to:

(A) an award value greater than zero; and (B) one of a plurality of video presentations which is displayed in addition to any display of the play of the game, said video presentation including content which is distinct and independent from:

(1) any outcome determination associated with the play of the game;

(2) any award determination associated with the play of the game; and (3) any value of any determined award;

(ii) a second outcome corresponding to:

(A) no award value greater than zero; and (B) one of the plurality of video presentations which is displayed in addition to any display of the play of the game, said video presentation including content which is distinct and independent from:

(1) any outcome determination associated with the play of the game;

(2) any award determination associated with the play of the game; and (3) any value of any determined award; and (iii) a third outcome corresponding to:

(A) an award value greater than zero; and (B) no display of one of the plurality of video presentations;

(b) if the determined outcome is the first outcome:

(i) display a portion of less than all of the content of the video presentation corresponding to the first outcome; and (ii) cause the award value corresponding to the first outcome to be provided;

(c) if the determined outcome is the second outcome, display a portion of less than all of the content of the video presentation corresponding to the second outcome; and (d) if the determined outcome is the third outcome, cause the award value corresponding to the third outcome to be provided.

11. A non-transitory computer readable medium comprising software with instructions for directing a processor to operate to:

(a) determine an outcome associated with a play of a game at a gaming device, the determine outcome being one of:

(i) a first outcome corresponding to:

(A) an award value greater than zero; and (B) one of a plurality of video presentations which is displayed in addition to any display of the play of the game, said video presentation including content which is distinct and independent from:

(1) any outcome determination associated with the play of the game;

(2) any award determination associated with the play of the game; and (3) any value of any determined award;

(ii) a second outcome corresponding to:

(A) no award value greater than zero; and (B) one of the plurality of video presentations which is displayed in addition to any display of the play of the game, said video presentation including content which is distinct and independent from:

(1) any outcome determination associated with the play of the game;

(2) any award determination associated with the play of the game; and (3) any value of any determined award; and (iii) a third outcome corresponding to:

(A) an award value greater than zero; and (B) no display of one of the plurality of video presentations;

(b) if the determined outcome is the first outcome:

(i) cause a portion of less than all of the content of the video presentation corresponding to the first outcome to be displayed; and (ii) cause the award value corresponding to the first outcome to be provided;

(c) if the determined outcome is the second outcome, cause a portion of less than all of the content of the video presentation corresponding to the second outcome to be displayed; and (d) if the determined outcome is the third outcome, cause the award value corresponding to the third outcome to be provided.

12. A method of operating a gaming system, said method comprising:

(a) providing a play of a first game to a player at a first gaming device;
(b) causing at least one processor to determine an outcome associated with the play of the first game at the first gaming device, the determined outcome being one of:
(i) a first outcome corresponding to:
(A) an award value greater than zero; and
(B) one of a plurality of video presentations which is displayed in addition to any game play displayed to the player, said video presentation including content which is distinct and independent from:
(1) any outcome determination associated with the play of the first game;
(2) any award determination associated with any play of any game; and
(3) any value of any determined award;
(ii) a second outcome corresponding to:
(A) no award value greater than zero; and
(B) one of the plurality of video presentations which is displayed in addition to any displayed play of the game, said video presentation including content which is distinct and independent from:
(1) any outcome determination associated with the play of the first game;
(2) any award determination associated with any play of any game; and
(3) any value of any determined award; and
(iii) a third outcome corresponding to:
(A) an award value greater than zero; and
(B) no display of one of the plurality of video presentations;
(c) if the determined outcome of the play of the first game is the first outcome:
(i) causing a first display device to display a first portion of less than all of the content of the video presentation corresponding to the first outcome to the player at the first gaming device; and
iii) causing the at least one processor to cause the award value corresponding to the first outcome to be provided to the player;
(d) if the determined outcome of the play of the first game is the second outcome, causing the first display device to display a first portion of less than all of the content of the video presentation corresponding to the second outcome to the player at the first gaming device;
(e) if the determined outcome of the first game is the third outcome, causing the at least one processor to cause the award value corresponding to the third outcome to be provided to the player;
(f) providing a play of a second game to the player at a second gaming device;
(g) determining an outcome associated with the play of the second game at the second gaming device, the determined outcome being one of the first outcome, the second outcome, and the third outcome;
(h) if the determined outcome of the play of the second game is the first outcome:
(i) causing a second display device to display a second portion of less than all of the content of the video presentation corresponding to the first outcome to the player at the second gaming device; and
(ii) causing the at least one processor to cause the award value corresponding to the first outcome to be provided to the player;
(i) if the determined outcome of the play of the second game is the second outcome, causing the second display device to display a second portion of less than all of the content of the video presentation corresponding to the second outcome to the player at the second gaming device; and
(j) if the determined outcome of the play of the second game is the third outcome, causing the award value corresponding to the third outcome to be provided to the player.

13. The method of claim 12, further including storing an indication of a termination point, the indication of the termination point denoting an end of the first portion.

14. The method of claim 12, further including storing an indication of a resumption point, the indication of the resumption point denoting a beginning of the second portion.

15. The method of claim 12, further including identifying the player at the first and second gaming device.

16. The method of claim 15, wherein identifying the player includes receiving a player tracking card from the player.

17. The method of claim 15, further including determining to provide the second portion of the content of the video presentation to the player at the second gaming device based at least in part on said identification of the player.

18. The method of claim 13, wherein the first gaming device comprises a video poker device.

19. The method of claim 12, wherein the content of the video presentation is selected from at least one of the group consisting of: a movie, a music video, a soap opera, and a sporting event.

20. The method of claim 12, wherein causing the second display device to display the second portion of the content of the video presentation includes displaying the second portion of the content of the video presentation after receiving a resume code.

21. The method of claim 20, further including providing the resume code to the player.

22. The method of claim 20, wherein receiving the resume code includes receiving the resume code from the player.

23. The method of claim 12, wherein the first gaming device is the second gaming device.

24. The method of claim 12, wherein the first gaming device is different than the second gaming device.

25. The method of claim 12, wherein causing the second display device to display the second portion of the content of the video presentation includes displaying the second portion of the content of the video presentation after receiving a player identifier.

26. The method of claim 25, wherein receiving the player identifier includes receiving the player identifier from a player tracking card.

27. A system comprising:
a controller; and
a memory device, said memory device storing a plurality of instructions, which when executed by the controller, cause the controller to operate to:
(a) provide a play of a first game to a player at a first gaming device;
(b) determine an outcome associated with the play of the first game at the first gaming device, the determined outcome being one of:
(i) a first outcome corresponding to:
(A) an award value greater than zero; and
(B) one of a plurality of video presentations which is displayed in addition to any game play displayed to the player, said video presentation including content which is distinct and independent from:
(1) any outcome determination associated with the play of the game;

(2) any award determination associated with any game play; and
(3) any value of any determined award;
(ii) a second outcome corresponding to:
(A) no award value greater than zero; and
(B) one of the plurality of video presentations which is displayed in addition to any display of the play of the game, said video presentation including content which is distinct and independent from:
(1) any outcome determination associated with the play of the game;
(2) any award determination associated with any game play; and
(3) any value of any determined award; and
(iii) a third outcome corresponding to:
(A) an award value greater than zero; and
(B) no display of one of the plurality of video presentations;
(c) if the determined outcome of the play of the first game is the first outcome:
(i) cause a first portion of less than all of the content of the video presentation corresponding to the first outcome to be displayed to the player at the first gaming device; and
(ii) cause the award value corresponding to the first outcome to be provided to the player;
(d) if the determined outcome of the play of the first game is the second outcome, cause a first portion of less than all of the content of the video presentation corresponding to the second outcome to be displayed to the player at the first gaming device; and
(e) if the determined outcome of the first game is the third outcome, cause the award value corresponding to the third outcome to be provided to the player;
(f) provide a play of a second game to the player at a second gaming device; and
(g) determine an outcome associated with the play of the second game at the second gaming device, the determined outcome being one of the first outcome, the second outcome, and the third outcome;
(h) if the determined outcome of the play of the second game is the first outcome:
(i) cause a second portion of less than all of the content of the video presentation corresponding to the first outcome to be displayed to the player at the second gaming device; and
(ii) cause the award value corresponding to the first outcome to be provided to the player;
(i) if the determined outcome of the play of the second game is the second outcome, cause a second portion of the content of the video presentation corresponding to the second outcome to be displayed to the player at the second gaming device; and
(i) if the determined outcome of the play of the second game is the third outcome, causing the award value corresponding to the third outcome to be provided to the player.

28. A non-transitory computer readable medium comprising software with instructions for directing a processor to:
(a) cause at least one first display device to display a play of a game to a player at a first gaming device;
(b) cause at least one processor to determine an outcome associated with the play of the game at the first gaming device, the determined outcome being one of:
i) a first outcome corresponding to:
(A) an award value greater than zero; and
(B) one of a plurality of video presentations which is displayed in addition to any game play displayed to the player, said video presentation including content which is distinct and independent from:
(1) any outcome determination associated with the play of the game;
(2) any award determination associated with the play of the game; and
(3) any value of any determined award;
(ii) a second outcome corresponding to:
(A) no award value greater than zero; and
(B) one of the plurality of video presentations which is displayed in addition to any display of the play of the game, said video presentation including content which is distinct and independent from:
(1) any outcome determination associated with the play of the game;
(2) any award determination associated with the play of the game; and
(3) any value of any determined award; and
(iii) a third outcome corresponding to:
(A) an award value greater than zero; and
(B) no display of one of the plurality of video presentations;
(c) if the determined outcome of the play of the game at the first gaming device is the first outcome:
(i) cause a first portion of less than all of the content of the video presentation corresponding to the first outcome to be displayed to the player at the first gaming device; and
(ii) cause the award value corresponding to the first outcome to be provided to the player;
(d) if the determined outcome of the play of the game at the first gaming device is the second outcome, cause a first portion of less than all of the content of the video presentation corresponding to the second outcome to be displayed to the player at the first gaming device; and
(e) if the determined outcome of the play of the game at the first gaming device is the third outcome, cause the award value corresponding to the third outcome to be provided to the player;
(f) cause at least one second display device to display a play of the game to the player at a second gaming device; and
(g) determine an outcome associated with the play of the game at the second gaming device, the determined outcome being one of the first outcome, the second outcome, and the third outcome;
(h) if the determined outcome of the play of the game at the second gaming device is the first outcome:
(i) causing a second portion of less than all of the content of the video presentation corresponding to the first outcome to be displayed to the player at the second gaming device; and
(ii) cause the award value corresponding to the first outcome to be provided to the player;
(i) if the determined outcome of the play of the game at the second gaming device is the second outcome, cause a second portion of the content of the video presentation corresponding to the second outcome to be displayed to the player at the second gaming device; and
(j) if the determined outcome of the second game is the third outcome, causing the award value corresponding to the third outcome to be provided to the player.

29. The method of claim 12, wherein the first game and the second game are a same type of game.

* * * * *

UNITED STATES PATENT AND TRADEMARK OFFICE

CERTIFICATE OF CORRECTION

PATENT NO. : 8,328,624 B2
APPLICATION NO. : 11/677955
DATED : December 11, 2012
INVENTOR(S) : Jay S. Walker et al.

It is certified that error appears in the above-identified patent and that said Letters Patent is hereby corrected as shown below:

IN THE CLAIMS

In Claim 1, Column 8, Line 63, between "content" and "the" insert --of--.
In Claim 1, Column 9, Line 8, between "instructions" and "cause" insert --to--.
In Claim 2, Column 9, Line 10, replace the second instance of "the" with --a--
In Claim 9, Column 9, Line 38, delete "selected from" and replace "of" with --selected from--.
In Claim 11, Column 10, Line 26, replace "determine" with --determined--.
In Claim 12, Column 11, Line 21, before "game" insert --first--.
In Claim 12, Column 11, Line 38, replace "iii)" with --(ii)--.
In Claim 19, Column 12, Line 26, delete "selected from" and replace "of" with --selected from--.
In Claim 27, Column 12, Line 67, between "the" and "game" insert --first--.
In Claim 27, Column 13, Line 8, between "the" and "game" insert --first--.
In Claim 27, Column 13, Line 11, between "the" and "game" insert --first--.
In Claim 27, Column 13, Lines 32 and 38, delete "and".
In Claim 27, Column 13, Line 57, replace "(i)" with --(j)--.
In Claim 28, Column 13, Line 64, between "a" and "game" insert --first--.
In Claim 28, Column 13, Line 66, between "the" and "game" insert --first--.
In Claim 28, Column 14, Line 1, replace "i)" with --(i)--.
In Claim 28; Column 14; Lines 8, 10, 15, 18, 20, 26, 34, and 39, between "the" and "game" insert --first--.
In Claim 28, Column 14, Line 38, delete "and".
In Claim 28, Column 14, Line 44, replace "the game" with --a second game-- and delete "and".
In Claim 28, Column 14, Line 46, before "game" insert --second--.

Signed and Sealed this
Tenth Day of September, 2013

Teresa Stanek Rea
*Acting Director of the United States Patent and Trademark Office*